June 23, 1959     H. F. PESEL     2,891,746
RESILIENT ACCESSORY MOUNT
Filed Nov. 14, 1955
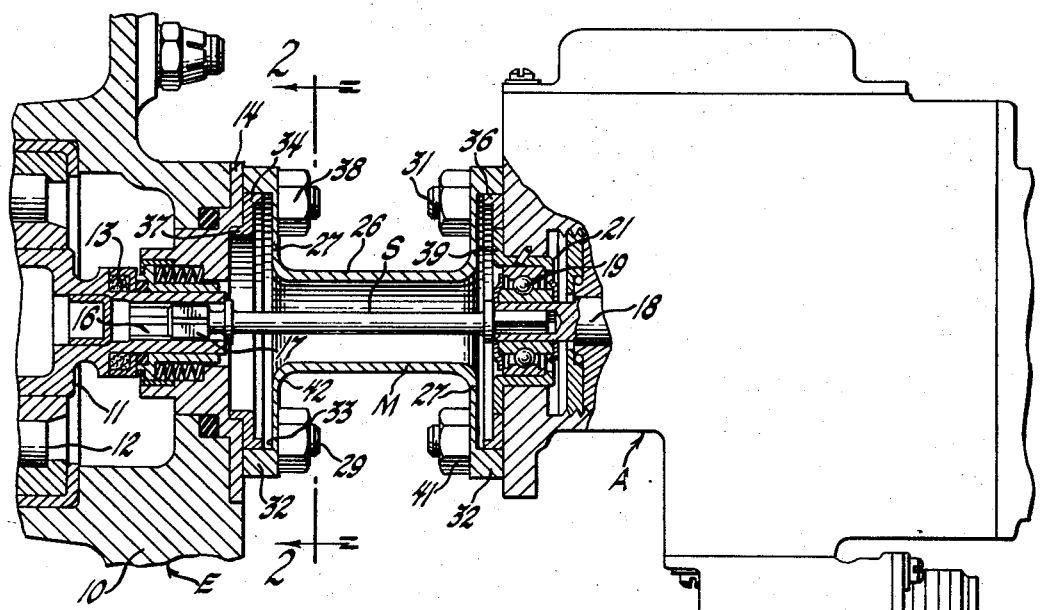
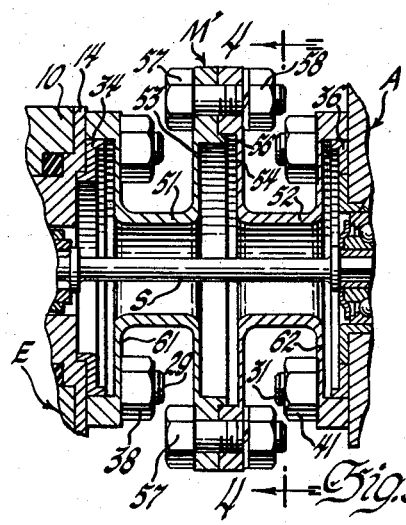
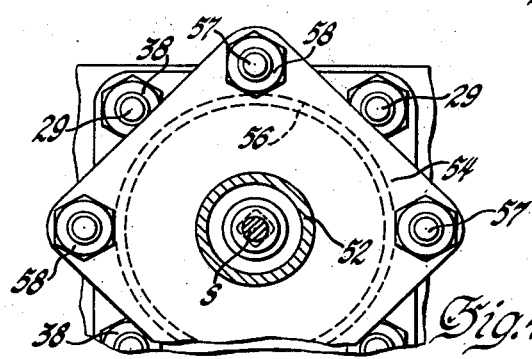
INVENTOR.
Henry F. Pesel
BY
ATTORNEY

United States Patent Office 2,891,746
Patented June 23, 1959

2,891,746
RESILIENT ACCESSORY MOUNT

Henry F. Pesel, Indianapolis, Ind., assignor to General Motors Corporation, Detroit, Mich., a corporation of Delaware Application November 14, 1955, Serial No. 546,457

3 Claims. (Cl. 248—15)

This invention relates to mounts or supports having resilient characteristics which are particularly adapted for supporting engine accessories or the like on engines which are characterized by relatively high frequency vibration in service. A particular use for which the invention is adapted, and in terms of which it is described in the succeeding specification, is a mount for a speed responsive switch device which is an accessory for a gas turbine aircraft engine.

Such engines includes turbines and compressors which ordinarily rotate at high speed. While the rotating structures must be carefully balanced, some vibration is inevitable. Also, the usual gearing which drives the engine accessories may set up gear-tooth vibration of high pitch and significant amplitude. Other vibration sources may give trouble. The prior practice has been to mount the speed switch rigidly on the engine, and it has been found that such vibration adversely affects the operation of the speed switch by causing chatter of the switch contacts and wear of the operating parts.

The present invention involves the interposition of a slightly resilient mount between the engine and the speed switch which serves as a cantilever support for the switch. The mount is sufficiently resilient, having regard to the weight of the switch, that the structure is tuned to a frequency lower than the lowest troublesome vibration frequency in the engine; thus, transmission of vibration from the engine to the switch is prevented or minimized. The mount is, however, sufficiently rigid to support the accessory in accurate alignment with the shaft which drives it notwithstanding buffeting of the aircraft or radical maneuvers which put a heavy acceleration load on the mount due to the inertia of the switch.

The principal objects of the invention are to improve the performance of engine accessories and to provide a mount for an engine accessory which is sufficiently rigid to support the accessory but sufficiently resilient to inhibit transmission of vibration from the engine to the accessory.

The nature of the invention and the advantages thereof will be clearly apparent to those skilled in the art from the succeeding description of preferred embodiments of the invention and the accompanying drawings in which:

Figure 1 is a view, with parts in section, of a speed switch supported in accordance with the invention on an engine only a fragmentary portion of which is illustrated;

Figure 2 is a transverse sectional view taken on the plane indicated by the line 2—2 in Figure 1;

Figure 3 is a longitudinal sectional view of a second form of mount; and

Figure 4 is a transverse sectional view of the same taken on the plane indicated by the line 4—4 in Figure 3.

Figure 1 shows a fragmentary part of an engine E, which may be part of an accessory drive case ordinarily included in such engines, an accessory device A, which specifically may be a speed responsive switch such as that disclosed in the prior application of Arthur W. Gaubatz, Serial No. 352,453, filed May 1, 1953 (now Patent No. 2,786,667), a mount M by which the speed switch is supported on the engine, and the coupling shaft S by which the switch is driven. It is to be understood that the internal structure of the engine and the speed switch are immaterial to the invention, which is directed to the connection between them.

The engine includes a case or housing 10 in which a shaft 11 driven in any suitable manner is rotatably supported by bearing 12. An oil seal 13 cooperating with the shaft is supported by a plate 14 which pilots into a circular opening in the housing 10 through which the end of shaft 11 projects. The interior of the end portion of shaft 11 has a square form indicated at 16 so as to receive and drive the square end 17 of shaft S. The other end of shaft S, which is hexagonal, is received in a hexagonal hole in the end of the operating shaft 18 of speed switch A, which is supported by a bearing 19 mounted in a cage 21.

The coupling M is an integral spool shaped member of metal, preferably steel, including a tubular body 26 and flexible radial end flanges 27. As shown more clearly in Figure 2, the margins 32 of flanges 27 are square so as to provide ears 28 through which studs 29 projecting from the housing 10 and studs 31 extending from the speed switch extend. The rims 32 of the flanges are relatively heavy compared to the webs of the flanges and define a recess 33 in each flange into which are pressed pilot rings 34 and 36. Ring 34 includes a forwardly projecting flange 37 which defines an external shoulder piloting in a recess in plate 14 to center the mount with respect to shaft 11. Studs 29 extend through plate 14 and flange 27 which are held on the housing 10 by nuts 38. The internal diameter of pilot ring 36 has a pilot fit over the periphery of the flange 39 of the bearing cage 21 so as to align the speed switch with the mount. The speed switch is held on the mount by nuts 41 on the studs 31.

The coupling must be proportioned to maintain alignment of the shafts 11 and 18 and also to give a vibration frequency for the mass-elastic system constituted by the speed switch and the mount which is below the frequency of the engine vibration. The dimensions of the structure may, of course, be determined by calculation from the weight of the accessory and the vibration frequency. The stiffness of the coupling is not critical, since there is ordinarily a substantial range between a coupling which is so stiff that it transmits the engine vibrations to the switch and one which is so resilient or weak that it fails to provide adequate support for the switch.

A desirable characteristic of the design of the mount is to have the flanges 27 thinner than the wall of the tubular body 26 to provide the needed flexibility and strength. In the particular coupling illustrated, which is about two inches in overall length and supports a device weighing about three pounds, the tubular wall is 0.08 inch thick and the flanges 27 are 0.06 inch thick; thus, most of the yielding to vibration is accomplished by bending of the flanges. The tubular portion is relatively rigid against axial or radial movement and the flanges, even though thin, will adequately resist radial loads. However, since the flanges can bend readily, vibration of the engine flexes the flanges, allowing the speed switch to remain stationary. It should be noted that the ends of the tubular body blend smoothly through arcuate portions 42 into the flanges to prevent undesirable stress concentration at the junction of the body and flange.

The form of mount illustrated in Figures 3 and 4 amounts essentially to a tandem arrangement of two spool-shaped mounts of the character illustrated in Figure 1. Because of the duplication of parts, the form of Figure 3 is more expensive but it has the advantage, which may be important in some situations, that it may be readily tuned to a lower frequency than the form of Figure 1 because there are four flexible flanges instead of two. The mount M' of Figure 4 comprises two spool-shaped flanged metallic bodies 51 and 52, the abutting flanges 53 and 54 of which have interengaging shoulders forming a pilot at 56. The exterior portion of flanges 53 and 54 is of thicker section and is of a generally square outline. Four bolts 57 pass through the corners of the flanges 53 and 54 with nuts 58 to fix the spools 51 and 52 rigidly together.

The forward flange 61 of spool 51 and the rear flange 62 of spool 52 may be identical to the flanges 27 of the form shown in Figure 1 and have mounted therein pilot rings 34 and 36 as in the previously described form. The flanges 61 and 62 are fixed to the housing 10 and the speed switch A in the same manner as previously described, and therefore the details of the connection will not be repeated.

The principle and mode of operation of this mount is the same as that of Figure 1 except that there are two flexible flanges in the middle of the mount in addition to the two at the end so that it will isolate the speed switch from vibrations of lower frequency. The flanges in the case, as previously, curve smoothly into the tubular body and are thinner than the body.

The advantages of the invention in providing a simple, rugged and durable mount which will carry relatively heavy acceleration loads but which is sufficiently flexible to prevent transmission of vibrations will be apparent.

The detailed description herein of preferred embodiments of the invention is not to be construed as limiting the invention, since many modifications within the principles of the invention may be made by the exercise of skill in the art.

I claim:

1. A resilient mount adapted for supporting an accessory device or the like on an engine characterized by high-frequency vibration in operation, the engine and device having means for attaching a mount thereto, the mount being of metallic material and generally of spool shape and comprising a tubular body and a radial flange at each end of the body integral therewith and curving smoothly into the body, the thickness of the flanges being less than that of the wall of the tubular body from which the flanges extend, the flanges having relatively heavy axially projecting rims at their peripheries configured for attachment to the engine and the device, respectively, for cantilever support of the device, the rims spacing the major part of the flanges from the engine and the device so that the flanges are free to flex in response to vibration, the mount being sufficiently flexible in relation to the mass of the device that the assembly of mount and device is tuned to a frequency lower than that of objectionable high-frequency vibrations developed by the engine in operation.

2. A resilient mount adapted for supporting an accessory device or the like on an engine characterized by high-frequency vibration in operation, the engine and device having means for attaching a mount thereto including a radial pilot on each, the mount being of metallic material and generally of spool shape and comprising a tubular body and a radial flange at each end of the body integral therewith and curving smoothly into the body, the thickness of the flanges being less than that of the wall of the tubular body from which the flanges extend, the flanges having relatively heavy axially projecting rims at their peripheries configured for attachment to the engine and the device, respectively, for cantilever support of the device, the rims spacing the major part of the flanges from the engine and the device so that the flanges are free to flex in response to vibration, the rims including shoulders for engagement with the radial pilots on the engine and the device, the mount being sufficiently flexible in relation to the mass of the device that the assembly of mount and device is tuned to a frequency lower than that of objectionable high-frequency vibrations developed by the engine in operation.

3. A resilient mount adapted for supporting an engine-driven accessory device or the like on an engine characterized by high-frequency vibration in operation, the engine and device having means for attaching a mount thereto and being coupled by a drive shaft flexibly connecting the engine to the device, the mount being of metallic material and generally of spool shape and comprising a tubular body defining an internal space to accommodate the drive shaft and a radial flange at each end of the body integral therewith and curving smoothly into the body, the thickness of the flanges being less than that of the wall of the tubular body from which the flanges extend, the flanges having relatively heavy axially projecting rims at their peripheries configured for attachment to the engine and the device, respectively, for cantilever support of the device, the rims spacing the major part of the flanges from the engine and the device so that the flanges are free to flex in response to vibration, the mount being sufficiently flexible in relation to the mass of the device that the assembly of mount and device is tuned to a frequency lower than that of objectionable high-frequency vibrations developed by the engine in operation.

References Cited in the file of this patent

UNITED STATES PATENTS

| Number | Name | Date |
|---|---|---|
| 1,639,644 | Baumann | Aug. 23, 1927 |
| 2,110,321 | Borgerd et al. | Mar. 8, 1938 |
| 2,146,529 | Chilton | Feb. 7, 1939 |
| 2,169,333 | Zerk et al. | Aug. 15, 1939 |
| 2,714,436 | Heisler | Aug. 2, 1955 |